United States Patent [19]

Greene

[11] 4,312,618

[45] Jan. 26, 1982

[54] LOADER-UNLOADER SYSTEM FOR WORK PIECES

[75] Inventor: Larry D. Greene, Centralia, Ill.

[73] Assignee: Acco Industries Inc., Bridgeport, Conn.

[21] Appl. No.: 68,411

[22] Filed: Aug. 21, 1979

[51] Int. Cl.$^3$ .............................................. B65G 57/20
[52] U.S. Cl. ................................ 414/225; 414/591; 414/627; 414/752; 414/737
[58] Field of Search ............... 414/222, 225, 591, 627, 414/752, 737, 541, 619; 29/563, 568

[56] References Cited

U.S. PATENT DOCUMENTS

| | | | |
|---|---|---|---|
| 2,247,787 | 7/1941 | Schmidt | 414/752 X |
| 3,418,099 | 12/1968 | Carter et al. | 414/752 X |
| 3,598,263 | 8/1971 | Ehmke | 414/737 X |
| 4,018,342 | 4/1977 | Cuniberti | 414/752 X |

*Primary Examiner*—Allen N. Knowles
*Attorney, Agent, or Firm*—Barnes, Kisselle, Raisch & Choate

[57] ABSTRACT

A loader-unloader system for loading and unloading work pieces, particularly work pieces having thin portions, in a machine tool wherein each work piece is held in position for rotation about a longitudinal axis during which various machine operations may be performed by the tool comprising a loading conveyor adapted to deliver articles in succession to a loading position, an unloading conveyor adapted to receive work pieces, and a loader-unloader assembly. The loader-unloader assembly comprises a track extending along an axis parallel to the longitudinal axis of the machine, a trolley movable along the track and means for moving said trolley back and forth along the said track. A load-vacuum clamping head assembly is mounted on the trolley, and an unload-vacuum head assembly is mounted on the trolley. Each assembly includes a vacuum head for gripping a work piece, means on the trolley for mounting said vacuum head for swinging movement into and out of position adjacent the machine and for reciprocating movement toward and away from the axis of said machine, and means for swinging the vacuum head from a position wherein the work piece has its axis extending parallel to the axis of the machine to a position wherein the axis of the work piece is at an acute angle to the axis of the machine.

10 Claims, 12 Drawing Figures

LOADER-UNLOADER SYSTEM FOR WORK PIECES

This invention relates to the loading and unloading of parts into a machine tool such as a lathe.

BACKGROUND AND SUMMARY OF THE INVENTION

It has been heretofore proposed that loading and unloading mechanisms be provided for placing and removing work pieces on a machine tool such as the chuck of a lathe so that various functions can be performed on the work piece and thereafter unloading the work piece.

The present invention is directed to a loading and unloading system wherein the work pieces are particularly thin so that they cannot be readily clamped and unclamped by heretofore used mechanical clamping devices associated with the loading and unloading mechanisms.

In accordance with the invention, a loader-unloader system is provided for loading and unloading work pieces, particularly work pieces having thin portions, in a machined tool wherein each work piece is held in position for rotation about a longitudinal axis during which various machine operations may be performed on the tool. The system comprises a loading conveyor adapted to deliver articles in succession to a loading position and an unloading conveyor adapted to receive work pieces. A loader-unloader assembly is provided adjacent the conveyors and comprises a track extending along an axis parallel to the longitudinal axis of the machine, a trolley movable along the track means, and means for moving the trolley back and forth along the track means. A load-vacuum clamping head assembly is mounted on the trolley, and an unload-vacuum head assembly is mounted on the trolley. Each assembly includes a vacuum head for gripping a work piece and is mounted on the trolley for swinging movement into and out of position adjacent the machine tool and for reciprocating movement toward and away from the axis of the machine tool.

DESCRIPTION

Figure 1:
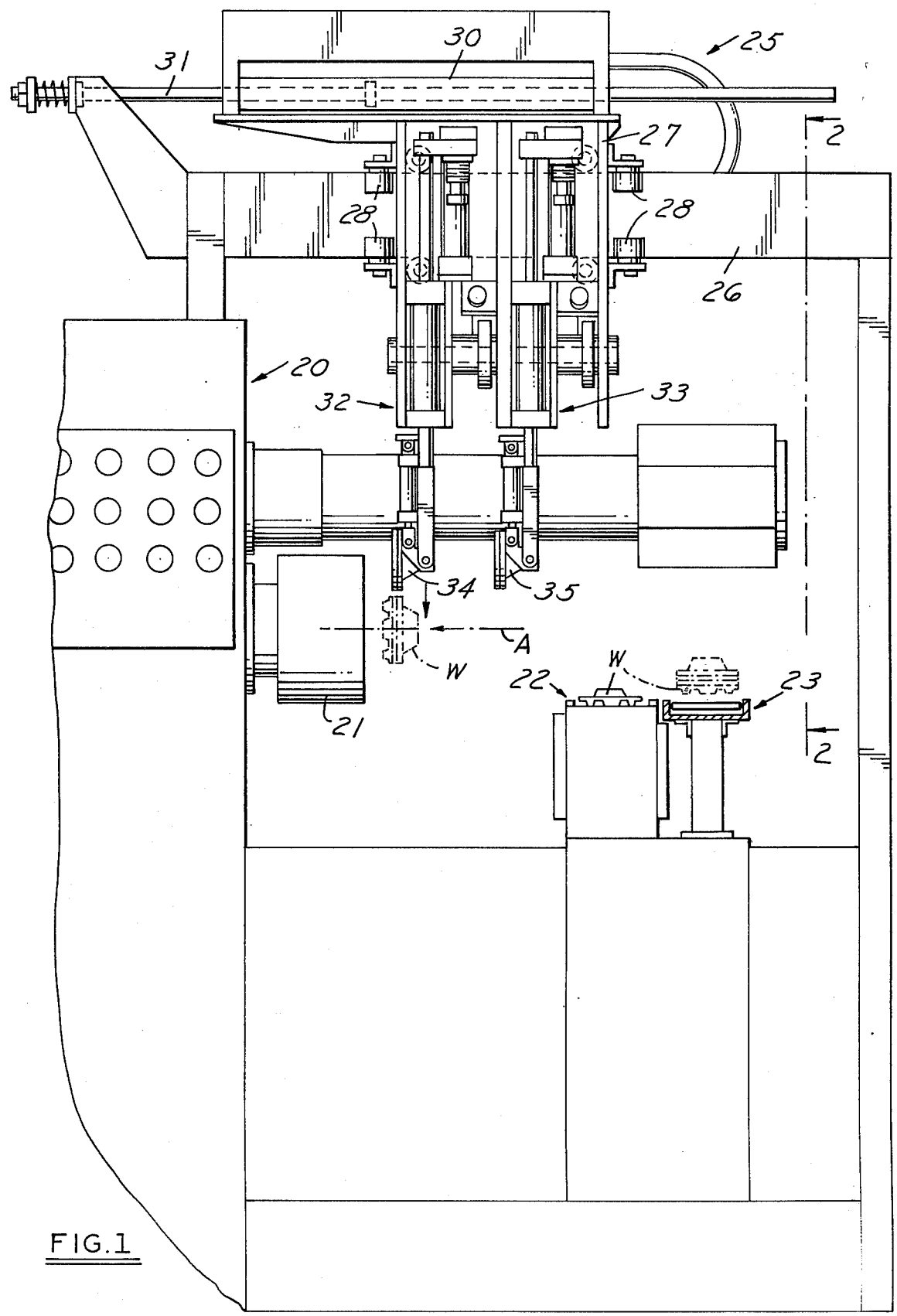
FIG. 1 is a fragmentary part sectional elevational view of a loading and unloading system embodying the invention.

Referring to FIG. 1 the loading and unloading system embodying the invention is shown in connection with a machine tool 20 such as a lathe which has a chuck 21 adapted to support work pieces W.

The system includes a loading conveyor 22 from which the work pieces are picked up and placed in the lathe and an unloading or receiving conveyor 23 which receives the work pieces from the lathe.

As further shown in FIG. 1 the loading and unloading assembly 25 comprises a beam 26 that defines a track on which a trolley 27 having wheels 28,29 (FIG. 2) is mounted for movement parallel to the axis A of the machine and chuck. A piston motor 30 is mounted on the frame and operates on a shaft 31 supported on the beam 26 to reciprocate the trolley parallel to the axis A along the beam.

A loading vacuum head assembly 32 and an unloading vacuum head assembly 33 are mounted on the trolley 27 and each supports a loading vacuum head 34 and unloading vacuum head 35 respectively. As shown in FIG. 1 each vacuum head 34,35 can pivot from a position wherein the axis of the work piece is parallel or aligned with the axis A of the chuck to a position wherein the axis of the work piece extends vertically so that it can be removed from the loading conveyor 22 or deposited on the the unloading conveyor 23 as the case may be.

In addition, as presently described, each vacuum head 34,35 can be pivoted as shown by the arrow B about an axis C and reciprocated as shown by the arrow D to move the vacuum head into and out of alignment with the axis A of the chuck 21.

Figure 2:
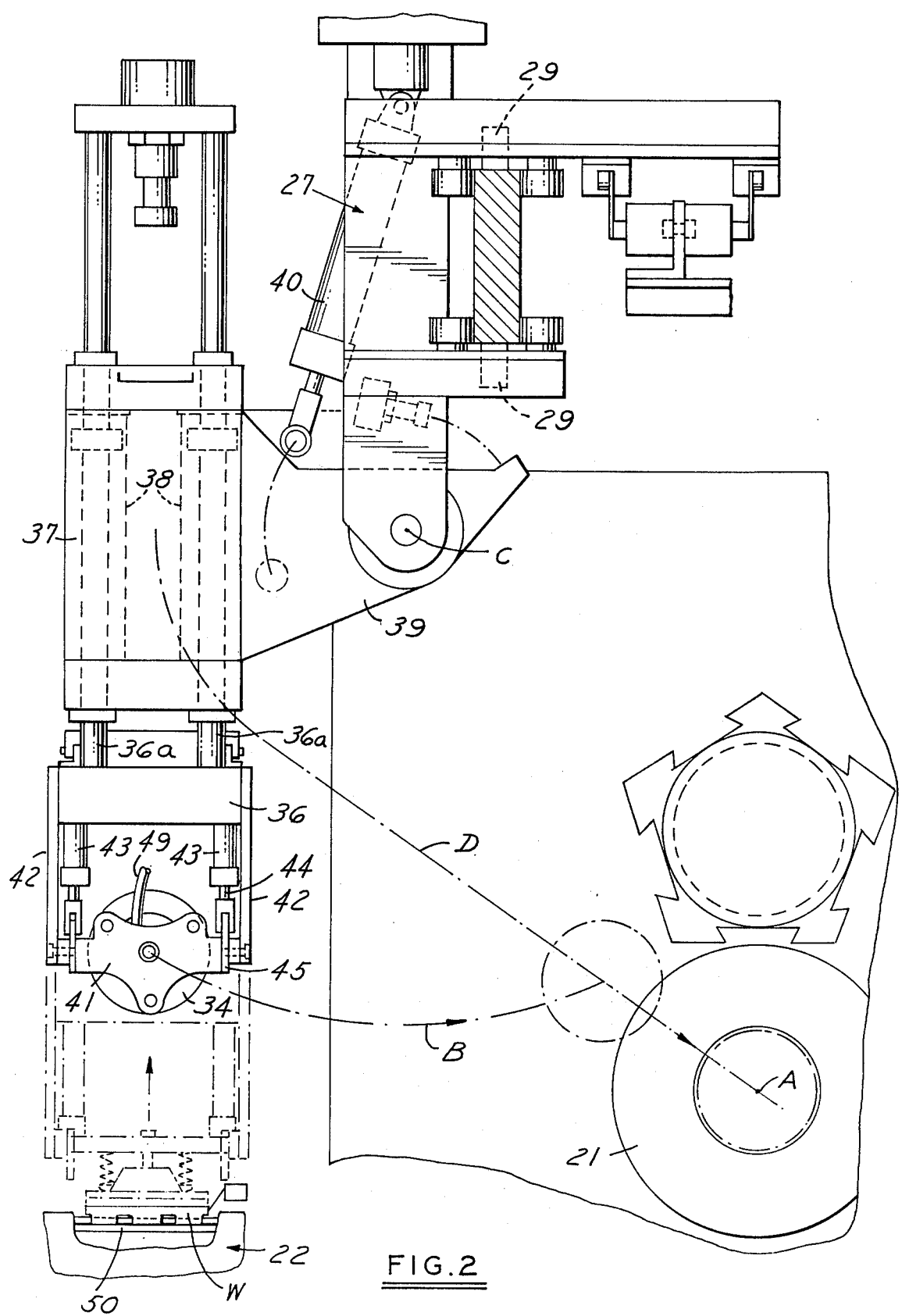
FIG. 2 is a fragmentary sectional view on an enlarged scale taken along the line 2—2 in FIG. 1.
Figure 3:
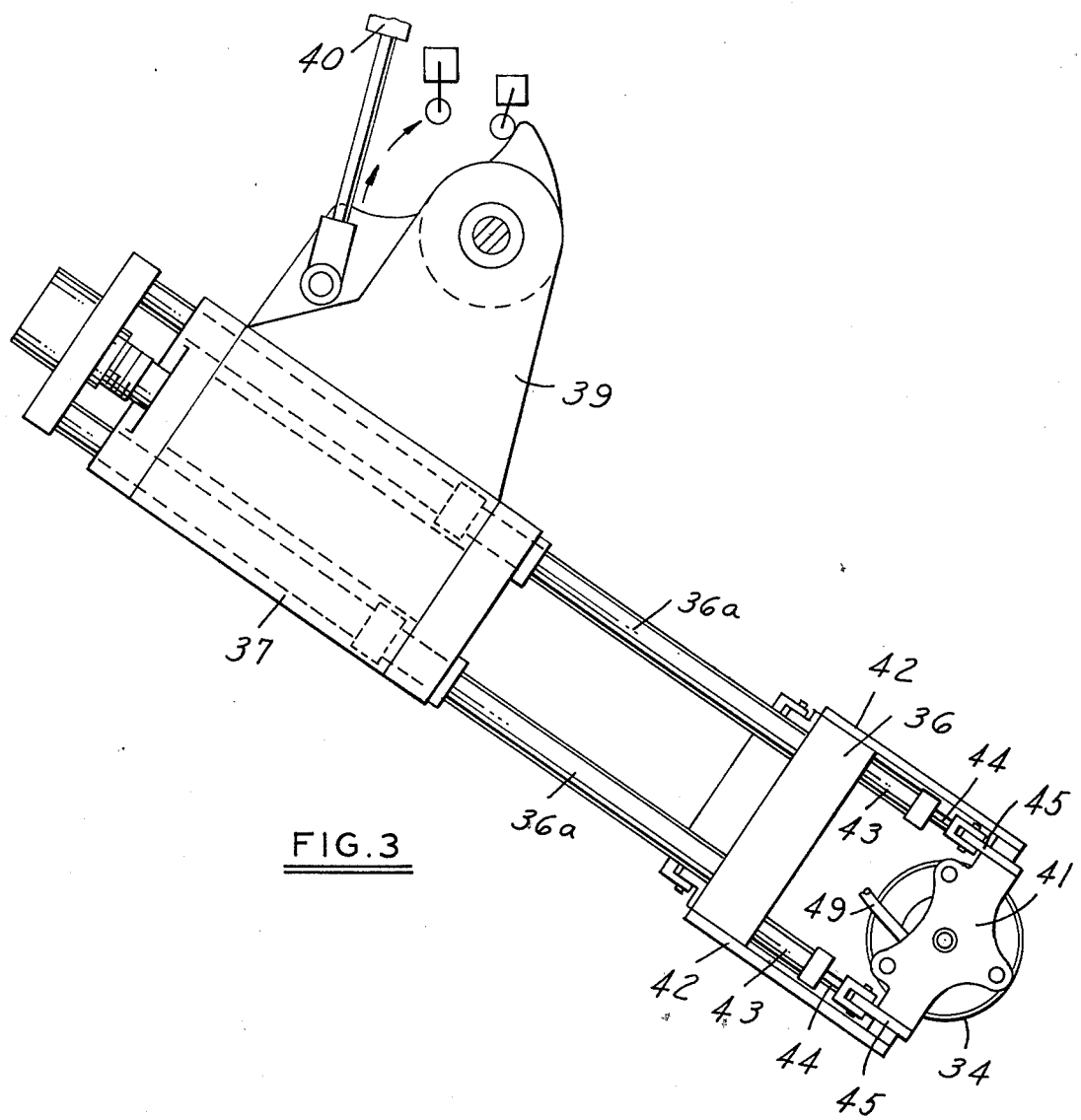
FIG. 3 is a fragmentary view similar to FIG. 2 showing the parts in a different operative position.

More specifically, as shown in FIG. 2, each vacuum head 34 or 35 is mounted on a secondary frame 36 mounted on shafts 36a that is reciprocable radially on a main frame 37 by operation of a cylinder 38. The main frame 37 in turn has a bracket 39 pivoted about the axis C on the trolley 27. A cylinder 40 is adapted to swing the frame 37 and in turn the vacuum head in the direction of the arrow B.

Figure 11:
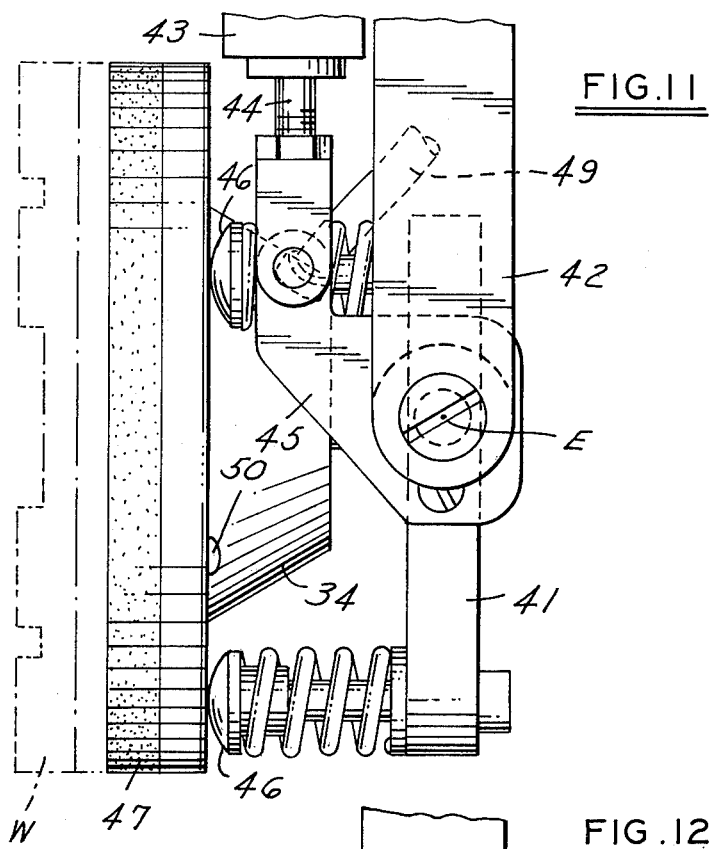
FIG. 11 is a fragmentary side elevational view of the vacuum head.
Figure 12:
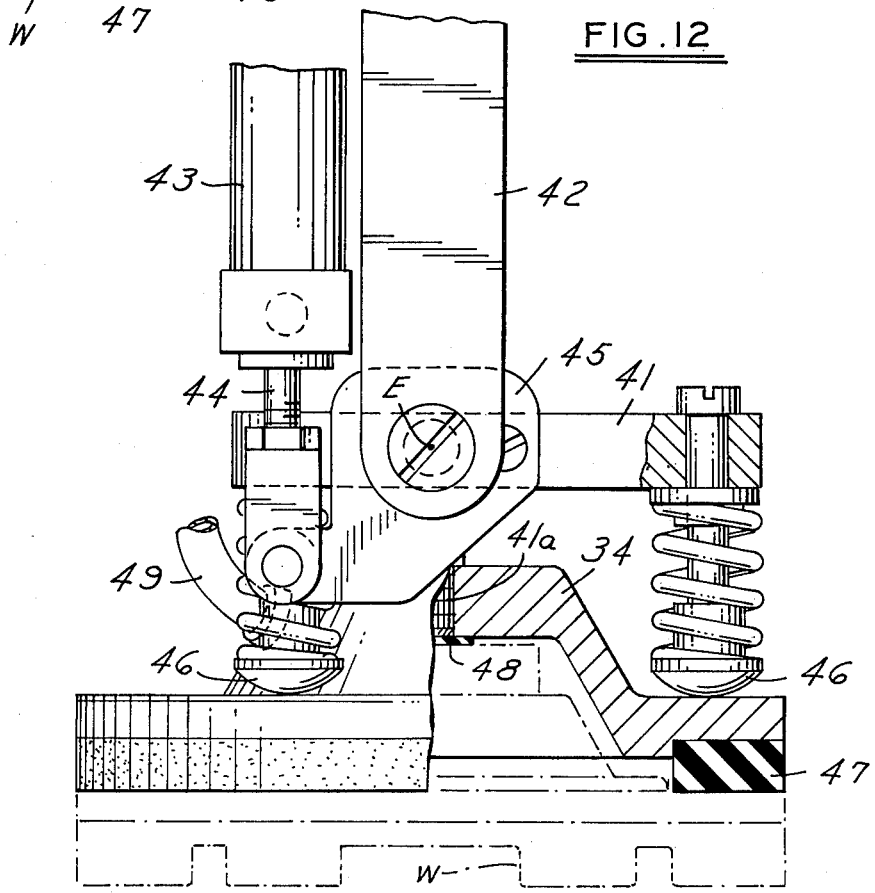
FIG. 12 is a fragmentary part sectional view of the head in a different operative position.

As further shown in FIGS. 2, 8-12, each vacuum head 34,35 is mounted on a plate 41 by a pin 41a mounted in plate 41 by a spherical bearing 41b and is rotatable about an axis E which is at a right angle to the axis of reciprocation of the head on arms 42. A cylinder 43 has it shaft 44 connected to a bracket 45 on the plate 41 so that the vacuum head can be pivoted about the axis E from a position such as shown in FIG. 11 to a position such as shown in FIG. 12. Spring loaded plungers 46 are yieldingly urged toward the plane of the vacuum head and thereby provide for resilient mounting of the head with respect to the plate 41.

With the work piece such as shown diagrammatically in FIG. 12, the vacuum head is generally frustoconical in cross section and includes a peripheral resilient pad 47 that engages a flange of the work piece and a base pad 48 engages the center of the work piece. A vacuum line 49 extends from an opening through the intermediate peripheral portion of the vacuum head to provide vacuum and thereby hold the work piece in position. It can be appreciated that after the work piece is machined, it may change in dimensions so that the vacuum head 35 will have one or more pads of different thickness in order to engage the reduced size of the work piece after machining operations are performed thereon.

Each vacuum head 34,35 also includes screws 50a that are threaded radially inwardly to engage an intermediate portion of the work piece that may be required to center it in the vacuum head.

Figure 4:
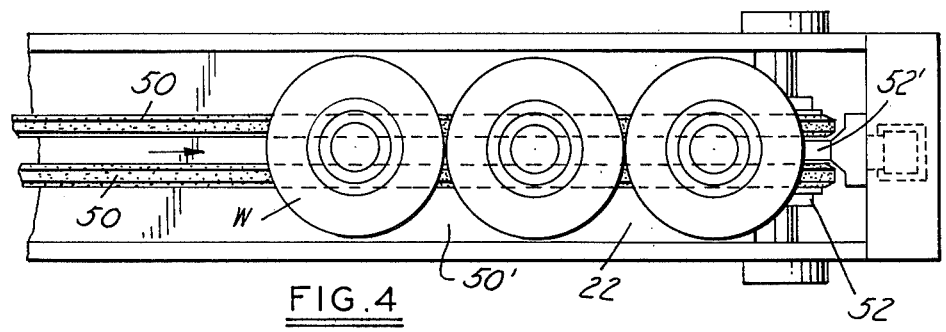
FIG. 4 is a fragmentary plan view of the loading conveyor.
Figure 5:
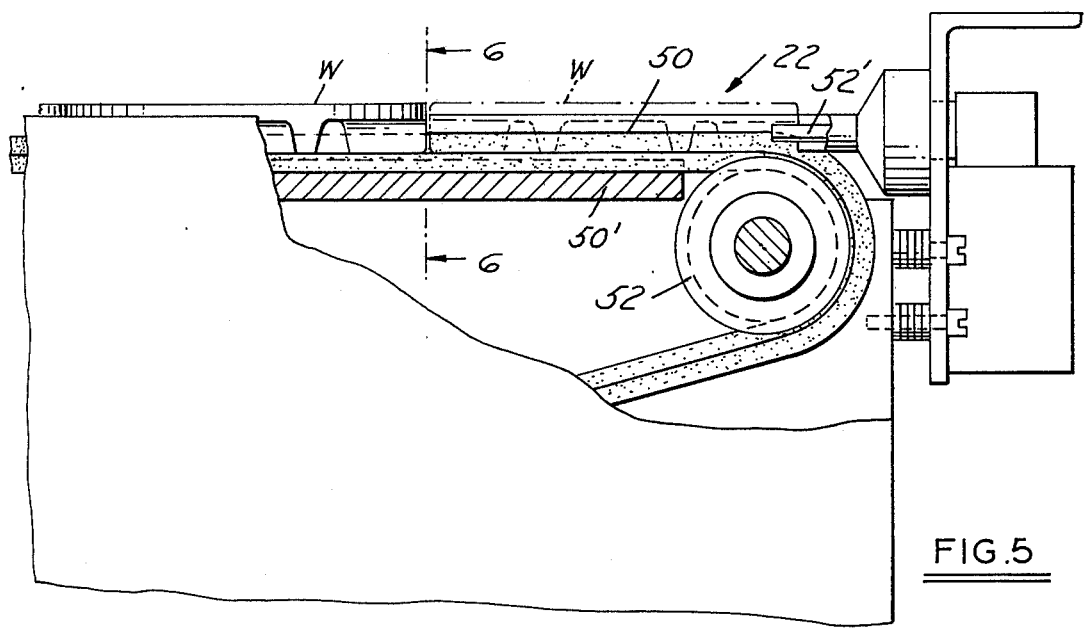
FIG. 5 is a fragmentary parts sectional elevational view of the loading conveyor.
Figure 6:
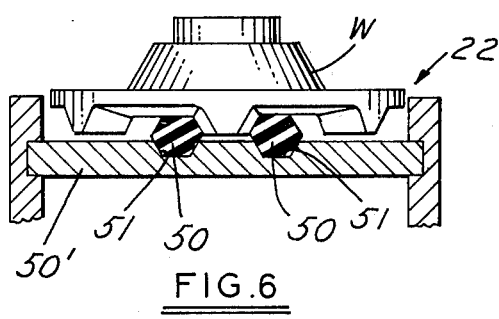
FIG. 6 is a fragmentary sectional view taken along the line 6—6 in FIG. 5.

Referring to FIGS. 4-6, the loading conveyor 22 preferably includes endless belts 50 of double taper cross section which move along grooves 51 in a plate 50' extending along the upper reaches of the belt and are trained over a plurality of pulleys, one of which is shown at 52. The work pieces are placed on the conveyor 22 with the chuck facing portions downwardly and are moved along by the conveyor to a stop 52' where the end most work piece is held until it is picked up by the chuck 34.

Figure 7:
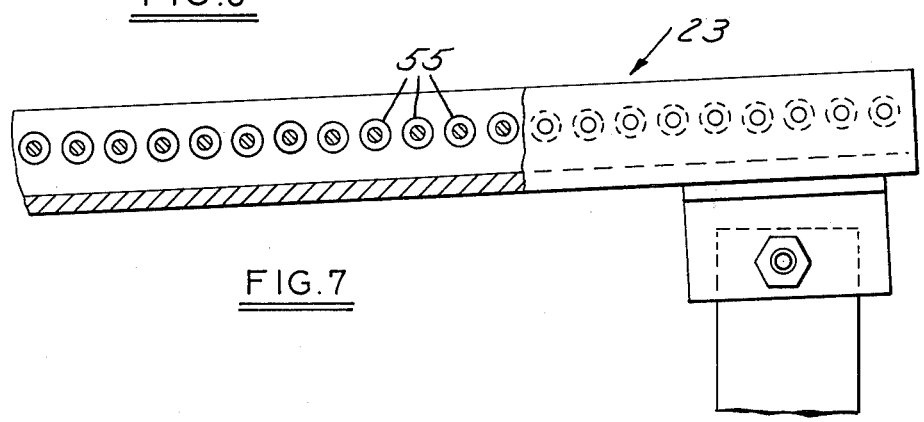
FIG. 7 is a fragmentary elevational view of the unloading conveyor.
Figure 8:
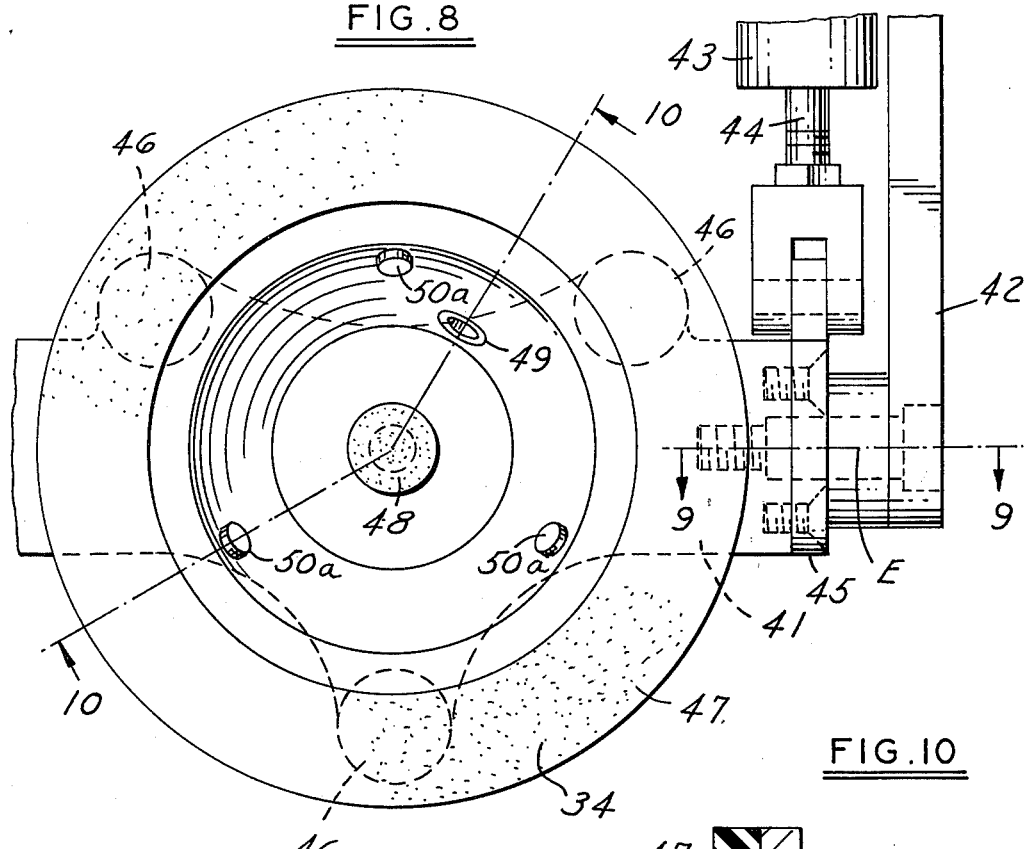
FIG. 8 is a fragmentary view of the vacuum head associated with each loading and unloading assembly.
Figure 9:
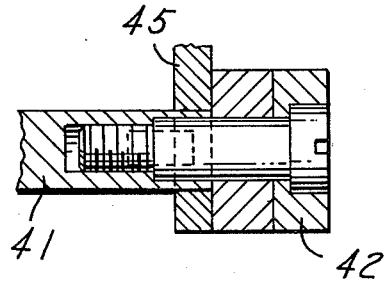
FIG. 9 is a fragmentary sectional view taken along the line 9—9 in FIG. 8.
Figure 10:
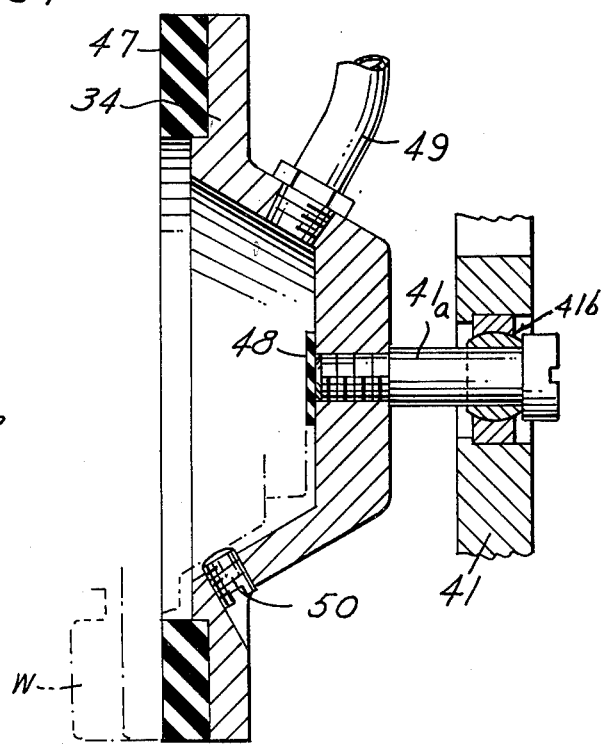
FIG. 10 is a fragmentary sectional view taken along the line 10—10 in FIG. 8.

The unloading conveyor 23 is preferably of the roller type and includes a plurality of transversely extending rollers 55 which extend and define a plane that is inclined downwardly away from the machine tool. (FIG. 7)

In operation, the work pieces W are moved by the conveyor 22 into position and then the loading vacuum head 34 is brought into position for picking up the work piece by reciprocating movement of the trolley 27 and swinging and reciprocal movement of the vacuum head to pick up the work piece W. The work piece W is then swung to the position shown in FIG. 2 and then reciprocated to bring its axis in alignment with the axis A for engagement with the chuck.

The vacuum head 34 is then swung out of position and retracted so that various machining operations can be performed. After the machining operations are performed, the trolley 27 is moved longitudinally and the vacuum unloading head 35 is swung into position and extended axially with respect to the frame 37 to pick up the work piece from the chuck. The vacuum head 35 is then swung back into position and retracted, and the vacuum head 35 is pivoted about the axis E to position wherein the work piece can be deposited on the unloading conveyor.

While the work piece is being deposited on the unloading conveyor, the vacuum head 34 can also be extended and swung into position for picking up a work piece on the loading conveyor. This is achieved by having the spacing between the loading assembly 32 and unloading assembly 33 equal to the longitudinal spacing between the conveyors 22,23.

After picking up a work piece, the loading assembly is then operated to bring the vacuum head 34 into position for depositing the new work piece in the chuck and the cycle continues after each machining operation.

I claim:

1. A loader-unloader system for loading and unloading work pieces, particularly work pieces having thin portions, in a machine tool wherein each work piece is held in position for rotation about a longitudinal axis by a chuck during which various machine operations may be performed by the tool comprising
a loading conveyor adapted to deliver articles in succession to a loading position wherein the articles have their axes extending generally vertically,
an unloading conveyor adapted to receive work pieces with the axes of said work pieces extending generally vertically,
a loader-unloader assembly comprising
means defining a track extending along an axis parallel to the longitudinal axis of the machine,
a trolley movable along said track means,
means for moving said trolley back and forth along said track means,
a load-vacuum clamping head assembly mounted on said trolley,
an unload-vacuum head assembly mounted on said trolley,
each said assembly including a vacuum head for gripping a work piece,
said loading conveyor and said unloading conveyor being positioned in side-by-side relation and extending transversely to the longitudinal axis of said machine,
said vacuum head of said load-vacuum head assembly having a configuration for gripping a work piece which is to be machined,
said vacuum head of said unload-vacuum head assembly having a configuration for gripping a work piece which has been machined,
and means on said trolley for mounting said vacuum head of each said assembly for swinging movement into and out of position adjacent said chuck and for reciprocating movement toward and away from the axis of said chuck,
and means for swinging said vacuum head of each said assembly from a position wherein said work piece has its axis extending parallel to the axis of the machine to a position wherein the axis of the work piece is at an acute angle to the axis of the machine and extending generally vertically and overlying its respective conveyor.

2. The system set forth in claim 1 wherein said means for mounting each vacuum head for swinging movement and reciprocating movement comprises a frame, means for pivoting said frame to said trolley,
means for moving said frame relative to said trolley about said pivotal axis,
means for mounting said vacuum head on said frame for reciprocating movement.

3. The system set forth in claim 1 wherein said loading conveyor comprises spaced endless belts supporting said work pieces and a stop adjacent said loading station between said belts adapted to engage a work piece and stop and hold it in loading position.

4. A loader-unloader system for loading and unloading work pieces, particularly work pieces having thin portions, in a machine tool wherein each work piece is held in position for rotation about a longitudinal axis by a chuck during which various machining operations may be performed by the tool comprising
a loader-unloader assembly comprising
means defining a track extending along an axis parallel to the longitudinal axis of the machine,
a trolley movable along said track means,
means for moving said trolley back and forth along said track means,
a load-vacuum clamping head assembly mounted on said trolley,
an unload-vacuum clamping head assembly mounted on said trolley,
each said assembly including a vacuum head for gripping a work piece,
said vacuum head of said load-vacuum head assembly having a configuration for gripping a work piece which is to be machined,
said vacuum head of said unload-vacuum head assembly having a configuration for gripping a work piece which has been machined, and means on said trolley for mounting said vacuum head of each said assembly for swinging movement into and out of position adjacent said chuck and for reciprocating movement toward and away from the axis of said chuck, and means for swinging said vacuum head of each said assembly from a position wherein said work piece has its axis extending parallel to the axis of the machine to a position wherein the axis of the work piece is at an acute angle to the axis of the machine.

5. The system set forth in claim 4 wherein said means for mounting each vacuum head for swinging movement and reciprocating movement comprises a frame, means for pivoting said frame to said trolley, means for moving said frame relative to said trolley about said pivotal axis, means for mounting said vacuum head on said frame for reciprocating movement.

6. A loader-unloader system for loading and unloading work pieces, particularly work pieces having thin portions, in a machine tool wherein each work piece is held in position for rotation about a longitudinal axis by a chuck during which various machining operations may be performed by the tool comprising a loading conveyor adapted to deliver articles in succession to a loading position, an unloading conveyor adapted to receive work pieces, a loader-unloader assembly comprising means defining a track extending along an axis parallel to the longitudinal axis of the machine, a trolley movable along said track means, means for moving said trolley back and forth along said track means, a load-vacuum clamping head assembly mounted on said trolley, an unload-vacuum head assembly mounted on said trolley, each said assembly including a vacuum head for gripping a work piece, and means on said trolley for mounting said vacuum head of each said assembly for swinging movement into and out of position adjacent said chuck and for reciprocating movement toward and away from the axis of said chuck, and means for swinging said vacuum head of each said assembly from a position wherein said work piece has its axis extending parallel to the axis of the machine to a position wherein the axis of the work piece is at an acute angle to the axis of the machine, said means for mounting said vacuum head comprising a secondary frame, a bracket mounted on said secondary frame for movement about an axis at a right angle to the axis of said reciprocating motion, and means for moving said bracket and thereby pivoting said head relative to said secondary frame.

7. The system set forth in claim 6 including resilient means yieldingly resisting axial movement of said head relative to said secondary frame.

8. The system set forth in claim 6 wherein said loading conveyor comprises spaced endless belts supporting said work pieces and a stop adjacent said loading station between said belts adapted to engage a work piece and stop and hold it in loading position.

9. A loader-unloader system for loading and unloading work pieces, particularly work pieces having thin portions, in a machine tool wherein each work piece is held in position for rotation about a longitudinal axis by a chuck during which various machining operations may be performed by the tool comprising a loader-unloader assembly comprising means defining a track extending along an axis parallel to the longitudinal axis of the machine, a trolley movable along said track means, means for moving said trolley back and forth along said track means, a load-vacuum clamping head assembly mounted on said trolley, an unload-vacuum clamping head assembly mounted on said trolley, each said assembly including a vacuum head for gripping a work piece, and means on said trolley for mounting said vacuum head of each said assembly for swinging movement into and out of position adjacent said chuck and for reciprocating movement toward and away from the axis of said chuck, and means for swinging said vacuum head of each said assembly from a position wherein said work piece has its axis extending parallel to the axis of the machine to a position wherein the axis of the work piece is at an acute angle to the axis of the machine, said means for mounting said vacuum head comprising a secondary frame, a bracket mounted on said secondary frame for movement about an axis at a right angle to the axis of said reciprocating motion, and means for moving said bracket and thereby pivoting said head relative to said secondary frame.

10. The system set forth in claim 9 including resilient means yieldingly resisting axial movement of said head relative to said secondary frame.

* * * * *